US007484212B2

(12) United States Patent
Hellerstein et al.

(10) Patent No.: US 7,484,212 B2
(45) Date of Patent: Jan. 27, 2009

(54) METHODS AND ARRANGEMENTS FOR AUTOMATED CHANGE PLAN CONSTRUCTION AND IMPACT ANALYSIS

(75) Inventors: Joseph L. Hellerstein, Ossining, NY (US); Alexander Keller, New York, NY (US); Vijaya Krishnan, Stamford, CT (US); Joel L. Wolf, Katonah, NY (US); Kun-Lung Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 901 days.

(21) Appl. No.: 10/789,147

(22) Filed: Feb. 27, 2004

(65) Prior Publication Data

US 2005/0193381 A1    Sep. 1, 2005

(51) Int. Cl.
*G06F 9/46* (2006.01)
(52) U.S. Cl. .................................. 718/100
(58) Field of Classification Search ............ 718/100
See application file for complete search history.

(56) References Cited

U.S. PATENT DOCUMENTS

| 5,721,824 | A | * | 2/1998 | Taylor ...................... 709/203 |
| 5,862,386 | A | | 1/1999 | Joseph et al. |
| 6,385,768 | B1 | | 5/2002 | Ziebell |
| 6,415,259 | B1 | * | 7/2002 | Wolfinger et al. ............... 705/8 |
| 6,601,023 | B1 | | 7/2003 | Deffler et al. |
| 2002/0049845 | A1 | * | 4/2002 | Sreenivasan et al. ........ 709/226 |
| 2003/0005426 | A1 | * | 1/2003 | Scholtens et al. ........... 717/169 |

OTHER PUBLICATIONS

J. Blazewicz, K. Ecker, G. Schmidt, J. Weglarz, Scheduling in Computer and Manufacturing Systems, Springer-Verlag, 1993.
E. Coffman, editor, Computer and Job-Shop Scheduling Theory, John Wiley and Sons, 1976.
M. Pindeo, Scheduling: Theory Algorithms and Systems, Prentice Hall 1995.
E. Lawler, Combinatorial Optimization: Networks and Matroids, Holt, Rinehart and Winston, 1976.
W. Press, B. Flanner, S. Teukolsk, W. Vetterling, Numerical Recipes: The Art of Scientific Computing, Cambridge University Press, 1986.
R. Motwani, P. Raghavan, Randomized Algorithms, Cambridge University Press, 1995.
The Institute of Electrical and Electronics Engineers, Inc., 1996, IEEE Standard for Information Technology—Portable Operating System Interface (POSIX) System Administration.
CAE Specification, Systems Management: Distributed Software Administration (XDSA), The Open Group, Jan. 1998.

\* cited by examiner

*Primary Examiner*—Meng-Ai An
*Assistant Examiner*—Mengyao Zhe
(74) *Attorney, Agent, or Firm*—Ference & Associates LLC

(57) ABSTRACT

Methods and arrangements for operating distributed computing systems, and more particularly, to techniques for constructing and analyzing change plans are disclosed. Included are an arrangement for submitting a request for change to the system, an arrangement for specifying the order in which tasks execute in compliance with data and temporal dependency constraints; and an arrangement for creating a change plan.

13 Claims, 4 Drawing Sheets

METHODS AND ARRANGEMENTS FOR AUTOMATED CHANGE PLAN CONSTRUCTION AND IMPACT ANALYSIS

FIELD OF THE INVENTION

The present invention relates generally to operating distributed computing systems, and more particularly, to techniques for constructing and analyzing Change Plans.

BACKGROUND OF THE INVENTION

Change Management is central to ensuring the availability, reliability, and quality of information technology (IT) services. Change Management is the process by which Information Technology (IT) systems are modified to accommodate considerations such as software fixes, hardware upgrades and performance enhancements. Examples include changing the schema of a database table in a running application and installing a new release of a web application server in a multi-tiered eCommerce system. The importance of change management is underscored by recent studies showing that operator errors account for a large fraction of failures of Internet services.

Central to Change Management is the Change Plan, the step-by-step procedure whereby a proposed change is implemented (e.g., Chou et al., Software—Practice and Experience v 30 n 3 2000, pp. 175-197) by modifying the various artifacts of the system. Examples of artifacts include programs, database tables, and initialization files. This is illustrated by two services, Order Display and Buy Confirmation, that use the credit card transitions database table, CC_XACTS. When there is a Change Request to modify the schema of the database table (e.g., to accommodate new accounting procedures), the Change Request describes the end result of the change, such as having successfully modified the table schema. The Change Plan specifies times at which various tasks execute to transition from the current state of the system to its desired state. In this example, modifying the database schema requires installing a new version of the servlets Ordrdisp and Buyconf that implement these services.

FIG. 1 displays a Change Plan for the Change Request in this example. Artifacts (either a database table or a servlet in this example) transition between different stages in their lifecycle: installable, executable, and running. For a service to be operational, all of its artifacts must be in the running state. To change an artifact, however, it must be transitioned first to the executable state and then to the installable state. The tasks in the plan are indicated by the lifecycle transition that they cause. The duration of the task is indicated by the length of its containing rectangle. For example, in the figure, Buyconf begins its transition from running to executable at time 0, and completes the transition at time 3.

The discussion will now focus on two parts of Change Management. The first is construction of the Change Plan. The Change Plan is critical to effective change management since it determines the state of artifacts and hence the impact on service delivery. As such, it is often desirable to provide impact analysis, whereby the effect of the Change Plan on services is determined. In particular, impact analysis indicates which artifacts and services are affected by a change.

Some kinds of automation for Change Management are considered in the current state-of-the-art. For example, (1) Change Plan execution may be automated using workflow (e.g., Maurer et al., IEEE Internet Computing, May-Jun. 2000, pp. 65-74), (2) the incorporation of software updates can be automated (e.g., U.S. Pat. No. 6,385,768, Ziebell, "System and method for incorporating changes as part of a software release"), and (3) versions and configurations can be managed for both persistent and transient objects (U.S. Pat. No. 5,862,386, Joseph et al., "Apparatus and method for providing a facility for managing versions and configurations of persistent and transient objects"). However, the construction of the Change Plan itself requires human intervention.

The current state-of-the-art is also limited as to impact analysis. Today, the focus is on identifying the affected artifacts and services (e.g., U.S. Pat. No. 6,601,023, Deffler et al., "Method for impact analysis of a model"). It is much more valuable, however, to refer to the duration of service outages caused by a change, or, more generally, to the cost of a change. These considerations are typically a function of the start and end time of service outages or degradations. For example, having an order entry application offline for two hours may not be a problem during a time when few people are shopping (e.g., Christmas Day) but may have a major impact at other times (e.g., the day before Christmas).

SUMMARY OF THE INVENTION

In accordance with at least one presently preferred embodiment of the present invention, there is broadly contemplated a system and method for constructing and analyzing Change Plans.

In summary, one aspect of the invention provides a system for automatic construction of a change plan, said system comprising: an arrangement for submitting a request for change to the system; an arrangement for constructing a task graph specifying the order in which tasks execute in compliance with data and temporal dependency constraints; and an arrangement for creating a change plan from the task graph.

Another aspect of the present invention provides a method for automatic construction of a change plan, said method comprising the steps of: submitting a request for change to the system; constructing a task graph specifying the order in which tasks execute in compliance with data and temporal dependency constraints; and creating a change plan from the task graph.

An additional aspect of the present invention provides a program storage device readable by machine, tangibly embodying a program of instructions executable by the machine to perform method steps for automatic construction of a change plan, said method comprising the steps of: submitting a request for change to the system; constructing a task graph specifying the order in which tasks execute in compliance with data and temporal dependency constraints; and creating a change plan from the task graph.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Several other copending and commonly owned U.S. patent applications, filed concurrently herewith, disclose various processes and arrangements whose details may, in the role of background information, help provide a better understanding of one or more of the embodiments disclosed and contemplated herein. Accordingly, those applications are hereby fully incorporated by reference as if set forth in their entirety herein, and are as follows (including the title and attorney docket number for each one): "Methods And Arrangements for Ordering Changes in Computing Systems" (U.S. patent application Ser. No. 10/709,123; and "Methods and Arrangements for Planning and Scheduling Change Management Requests in Computing Systems" (U.S. patent application Ser. No. 10/789,099.

Figure 2:
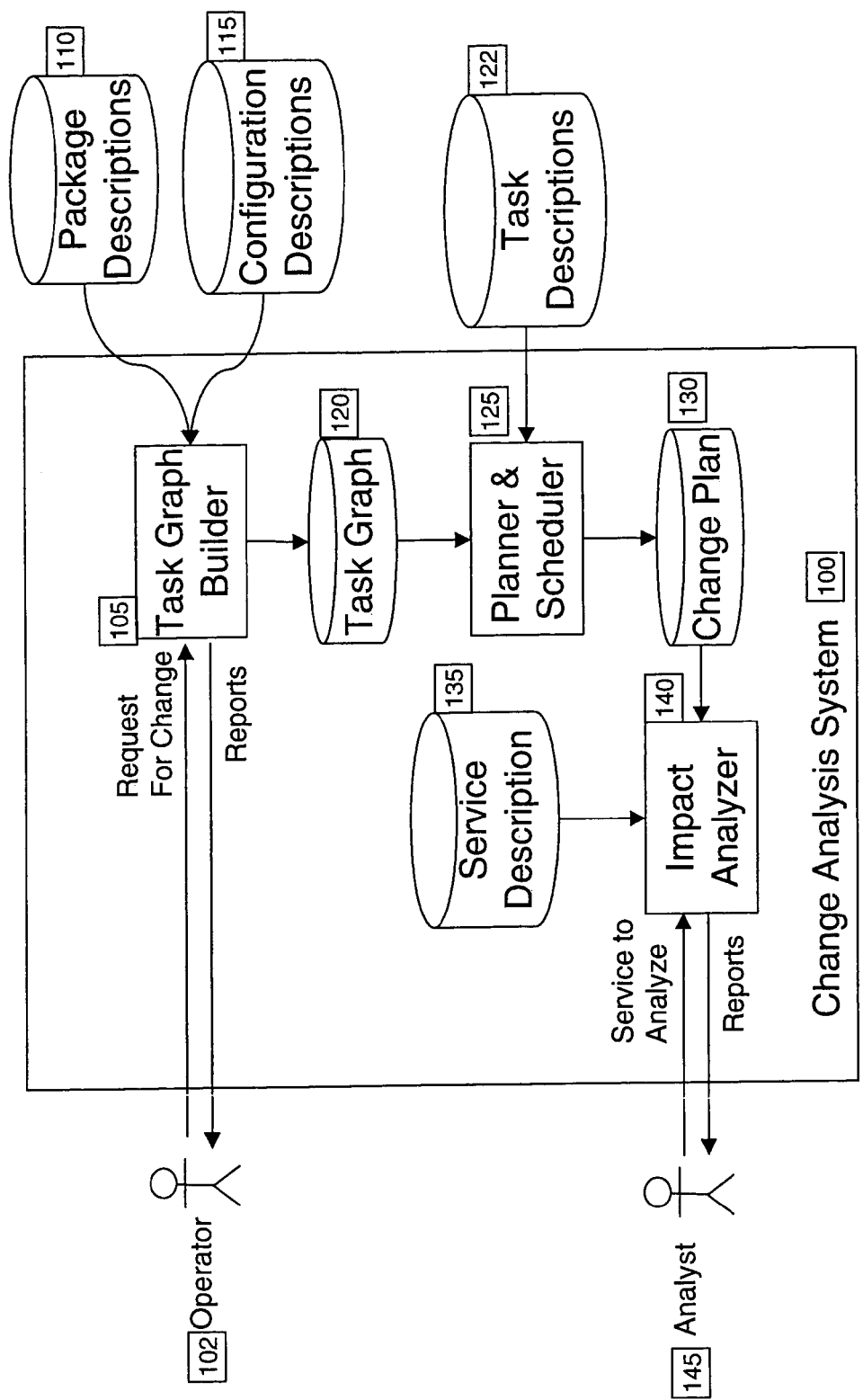
FIG. 2 is a block diagram of a system in accordance with the present invention.

Referring now to FIG. 2, the components of the Change Analysis System (100) and the interactions with human operators (102) and analysts (145) is shown. The operator submits a request for change to the system. This is accepted by the Task Graph Builder (105) component (which is described in "Methods And Arrangements for Ordering Changes in Computing Systems" (Docket No. YOR920030547US1), infra). The Change Request is, in essence, a request for one or more packages. Thus, another input used by the Task Graph Builder are the descriptions of packages (110). Some of these packages may already be installed and hence the Task Graph Builder also takes as input Configuration Descriptions (115) so that it knows the current state of the system. The Task Graph Builder constructs a Task Graph (120) that specifies the order in which tasks execute in compliance of data and temporal dependency constraints. This is input to the Planner & Scheduler (125) (which is described in "Methods and Arrangements for Planning and Scheduling Change Management Requests in Computing Systems" (Docket No. YOR920030549US1), infra). A key input to the Planner & Scheduler are task descriptions (122) that specify, among other things, what lifecycle transitions are imposed on the artifacts of the system by the execution of the task. The output of the Planner & Scheduler is the Change Plan (130). This is used by the impact analyzer (140) to respond to requests by an analyst to analyze a service. Another input to the impact analyzer is service descriptions (135) that specify what artifacts and other services are used by a service being analyzed.

Figure 3:
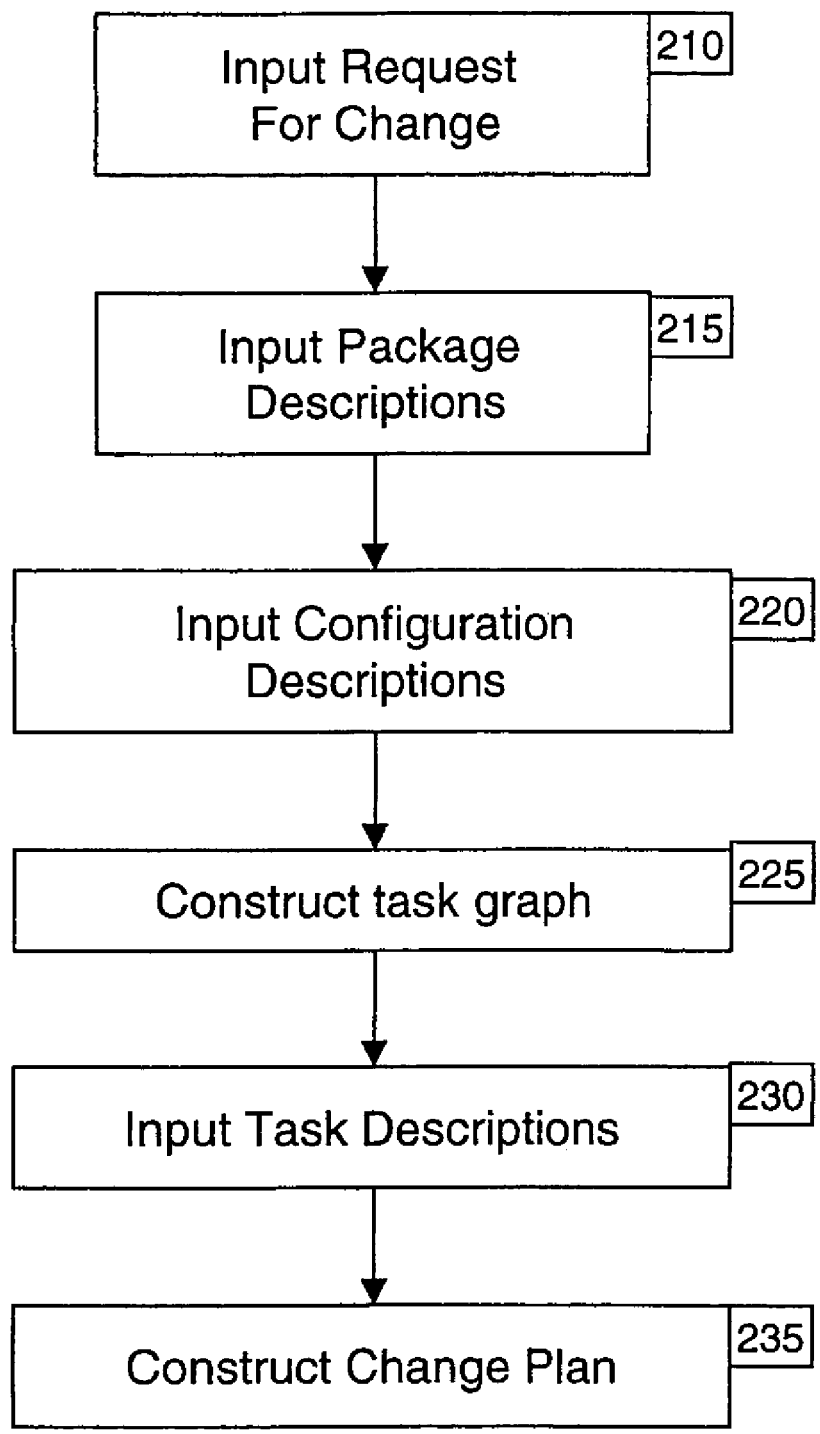
FIG. 3 is a flow chart of a method for Change Plan construction in accordance with the present invention.

Referring now to FIG. 3, a method in accordance with the present invention to construct a Change Plan is shown. In steps 210, 215, and 220, the Task Graph Builder inputs the Request for Change, Package Descriptions, and Configuration Descriptions. In 225, the Task Graph Builder constructs the Task Graph. In 230 and 235, the Planner & Scheduler inputs the Task Graph and Task Descriptions to construct the Change Plan.

Figure 4:
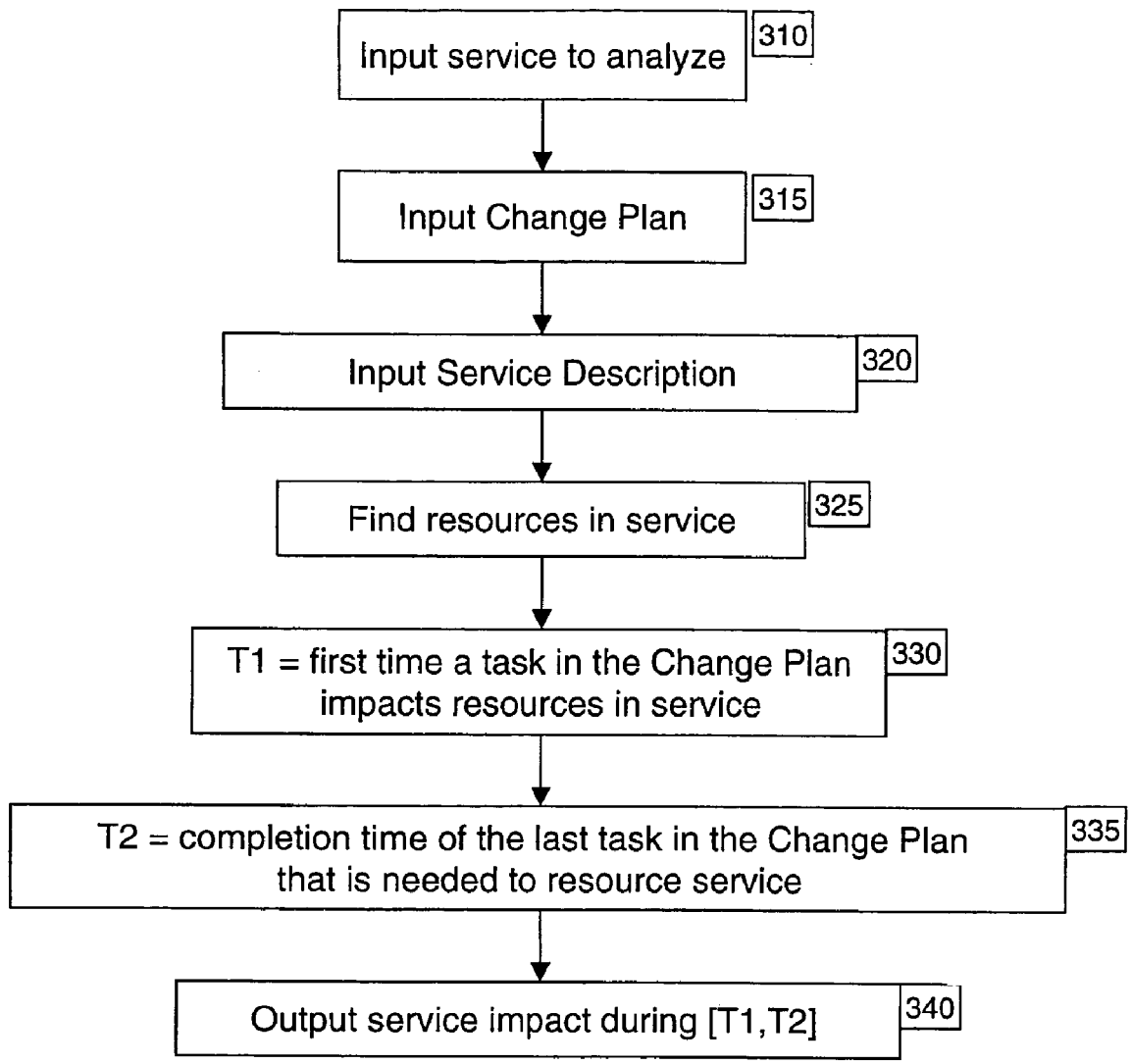
FIG. 4 is a flow chart of a method for impact analysis in accordance with the present invention.

Referring now to FIG. 4, a method for impact analysis in accordance with the present invention is shown. In steps 310, 315, and 320, the Impact Analyzer inputs the service to analyze, the Change Plan, and the Service Descriptions. In 330, the Impact Analyzer computes T1, the first time that an artifact of the service to analyze transitions out of the running state. In 335, the Impact Analyzer computes T2, the completion time of the task in the Change Plan that results in having all artifacts of the service in the running state. In step 340, the Impact Analyzer reports the impact of the Change Plan on the service. This may use information that can be in the Service Description such as the number of requests for the service at different times of the day and the cost of a service outage.

Figure 1:
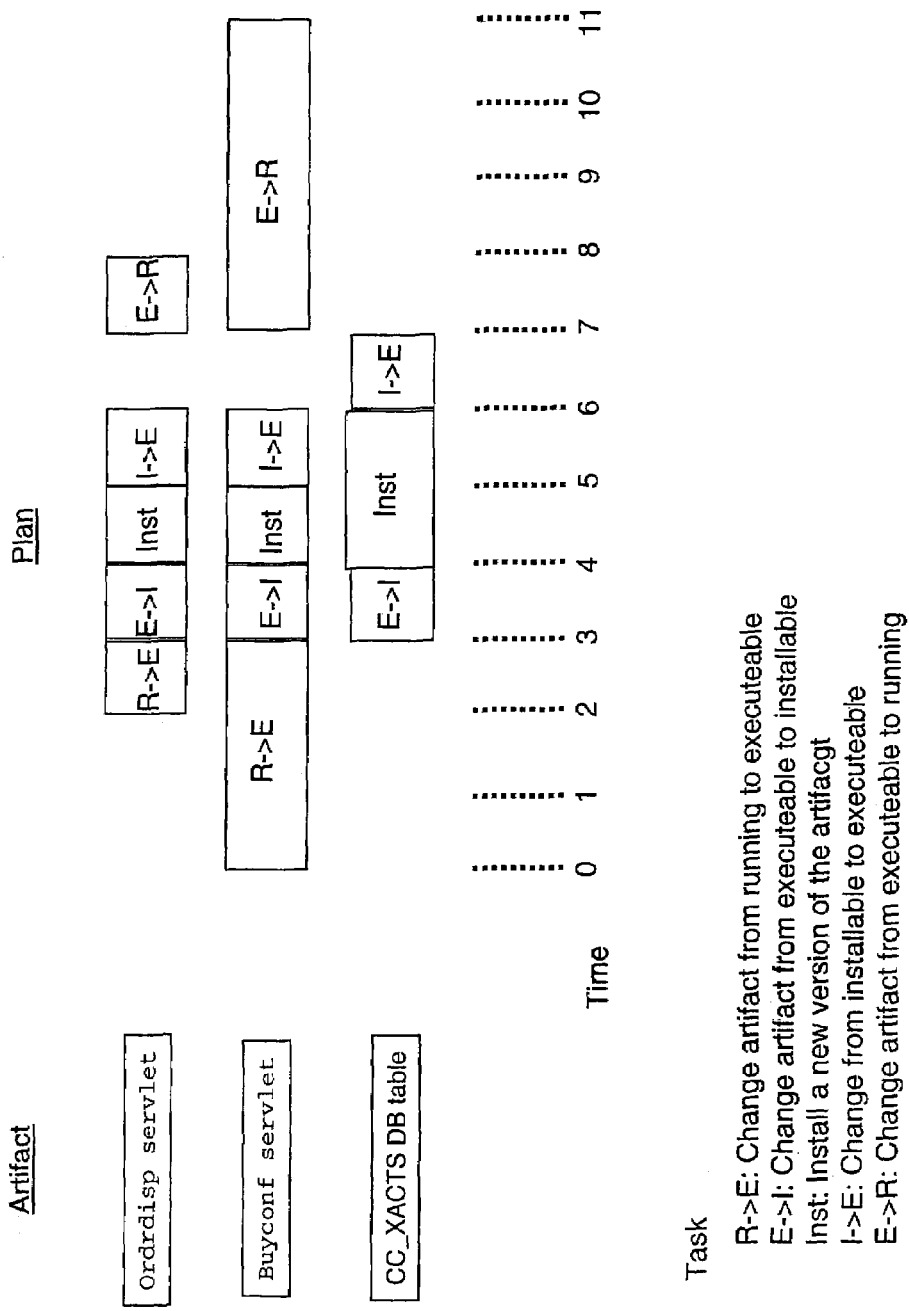
FIG. 1 illustrates a Change Plan.

The Change Plan in FIG. 1 will now be used to illustrate the operation of steps 330 and 335 of the Impact Analyzer. Suppose that the Order Display service has two artifacts, the Ordrdisp serverlet and the CC_XACTS database table. Further, assume that all artifacts of the change plan are initially in the running state. Then, T1=2 since the first task that causes an Ordrdisp artifact to transition from running to executable begins its execution at time 2. Further, T2=8 since the last Ordrdisp artifact to transition back to the executable state is completed at time 8.

While the foregoing discussion of impact analysis focuses on the availability of a service, it is obvious to one versed in the art that this can be extended to the performance of a service. For example, many web services make use of tiers of servers, each of which contains multiple clones. A Change Plan applied to one clone does not make the service unavailable, but it does degrade performance.

It is to be understood that the present invention, in accordance with at least one presently preferred embodiment, includes an arrangement for submitting a request for change to the system, an arrangement for constructing a task graph specifying the order in which tasks execute in compliance with data and temporal dependency constraints, and an arrangement for creating a change plan from the task graph. Together, these may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer system comprised of a computer processor configured for executing program instructions stored in computer memory and arranged for automatic construction of a software package change plan data output, said system comprising:

an arrangement for submitting a request for accomplishing a software change to the computer system, wherein the request for accomplishing a software change describes a task to be done on at least one target system and a deadline by which a change needs to be completed;

an arrangement for constructing a task graph specifying the order in which tasks accomplishing a software change execute on the system in compliance with data and temporal dependency constraints;

an arrangement for creating a software package change plan according to the task graph;

wherein the arrangement for creating a software package change plan includes an arrangement for determining operating state transitions that are imposed on software artifacts of the system by execution of the tasks; and further comprising an arrangement for analyzing the software package change plan, whereby the duration of a system service outage caused by a change plan is determined;

wherein the software package change plan is used to execute the software change.

2. The system of claim 1, further comprising an arrangement for storing information about software packages which is installed on the computer system.

3. The system of claim 2, further comprising an arrangement for storing information about a current configuration of the computer system.

4. The system of claim 1, further comprising an arrangement which specifies software artifacts and other services being used by the system service being analyzed.

5. The system of claim 1, further comprising an arrangement which specifies the impact on service level agreements as a result of executing the software package change plan.

6. The system of claim 1, further comprising an arrangement which specifies the impact on installation policies as a result of executing the software package change plan.

7. A method for automatic construction of a software package change plan, said method comprising the steps of:
    submitting a request for accomplishing a software change to a computer systems wherein the request for accomplishing a software change describes a task to be done on at least one target system and a deadline by which a change needs to be completed;
    constructing a task graph specifying the order in which tasks accomplishing a software change execute on the system in compliance with data and temporal dependency constraints;
    creating a software package change plan according to the task graph;
    wherein the step of creating a software package change plan includes determining operating state transitions that are imposed on software artifacts of the system by execution of the tasks; and
    further comprising the step of analyzing the software package change plan, whereby the duration of a system service outage caused by a change plan is determined;
    wherein the software package change plan is used to execute the software change.

8. The method of claim 7, further comprising the step of storing information about software packages which is installed on the computer system.

9. The method of claim 8, further comprising the step of storing information about a current configuration of the computer system.

10. The method of claim 7, further comprising the step of specifying software artifacts and other services being used by the system service being analyzed.

11. The method of claim 7, further comprising the step of specifying the impact on service level agreements as a result of executing the software package change plan.

12. The method of claim 7, further comprising the step of specifying the impact on installation policies as a result of executing the software package change plan.

13. A computer program storage device readable by a computer processor machine, tangibly embodying a program of instructions executable by the machine to perform method steps for automatic construction of a software package change plan data output, said method comprising the steps of:
    submitting a request for accomplishing a software change to a computer system, wherein the request for accomplishing a software change describes a task to be done on at least one target system and a deadline by which a change needs to be completed;
    constructing a task graph specifying the order in which tasks accomplishing a software change execute on the system in compliance with data and temporal dependency constraints;
    creating a software package change plan according to the task graph;
    wherein the step of creating a software package change plan includes determining operating state transitions that are imposed on software artifacts of the system by execution of the tasks; and
    further comprising the step of analyzing the software package change plan, whereby the duration of a system service outage caused by a change plan is determined;
    wherein the software package change plan is used to execute the software change.

* * * * *